TIME DIVISION SIGNALING ARRANGEMENT

Filed March 18, 1966

INVENTOR.
ROBERT M. SCHILDGEN
JOHN S. YOUNG
BY
Bernard E. Franz
ATTY.

April 22, 1969 R. M. SCHILDGEN ET AL 3,440,355

TIME DIVISION SIGNALING ARRANGEMENT

Filed March 18, 1966 Sheet 3 of 9

POSITION CIRCUIT

April 22, 1969 R. M. SCHILDGEN ET AL 3,440,355

TIME DIVISION SIGNALING ARRANGEMENT

Filed March 18, 1966 Sheet 5 of 9

United States Patent Office 3,440,355

Patented Apr. 22, 1969

3,440,355

TIME DIVISION SIGNALING ARRANGEMENT

Robert M. Schildgen, Northbrook, and John S. Young, Addison, Ill., assignors to Automatic Electric Laboratories, Inc., Northlake, Ill., a corporation of Delaware
Filed Mar. 18, 1966, Ser. No. 535,404
Int. Cl. H04q 3/42
U.S. Cl. 179—27 10 Claims

ABSTRACT OF THE DISCLOSURE

Signaling conductors are connected in common to all of the terminating circuits of two groups, and a time division generator supplies enabling signals in recurring time slots. The terminating circuits of one group are permanently associated with respective time slots. The particular embodiment shown is for special operator circuit. Provision is made to display and to change the class of call.

This invention relates to a time division signaling arrangement, and more particularly to an arrangement for use with a communication switching system to signal information concerning a call.

Many time division arrangements are known for use in communication switching systems, both for the transmission of voice signals and for transmission of various control signals. However, in arrangements for connecting any one of a plurality of terminating circuits in one group to any one of a plurality of terminating circuits in another group, while the time division supply may be connected to the circuits of one group, signals occurring in the same recurring time slot must be selectively coupled to a circuit of the other group. This requires a memory, an arrangement for storing the desired connection information in the memory, and an arrangement for using the information from memory to control gate circuits to couple the time division generator to the selected terminating circuit.

The object of this invention is to provide an arrangement for use in a communication switching system having a space division switching network to selectively interconnect two terminating circuits, in which the principal communcation path is via the switching network; to provide a simple, effective, and fast operating arrangement to transmit auxiliary information between these terminating circuits.

According to the invention a plurality of signaling conductors are connected in common to all of the terminating circuits of two groups, and a time division generator is provided for supplying enabling signals in recurring time slots, with the terminating circuits of one group permanently and individually associated with respective time slots and connected to corresponding outlets of the time division generator, and the identity of the time slot is applied to the terminating circuit of the other group over an extra control conductor of the space division switching network.

Preferably the receiving devices connected to the signaling conductors are relay-capacitance combinations as covered by our copending United States patent application Ser. No. 295,098 filed July 15, 1963, for Time Division Signaling Arrangement. A sending device such as a set of relay contacts is used at the opposite end of each signaling conductor in each terminating circuit. Thus signaling may take place between several terminating circuit pairs in respective time slots of the same time division generator cycle.

The above-mentioned and other objects and features of this invention and the manner of attaining them will become more apparent and the invention itself will be best understood, by reference to the following description of embodiments of the invention taken in conjunction with the accompanying drawings comprising FIGS. 1 to 10, wherein.

Figures 2, 3:
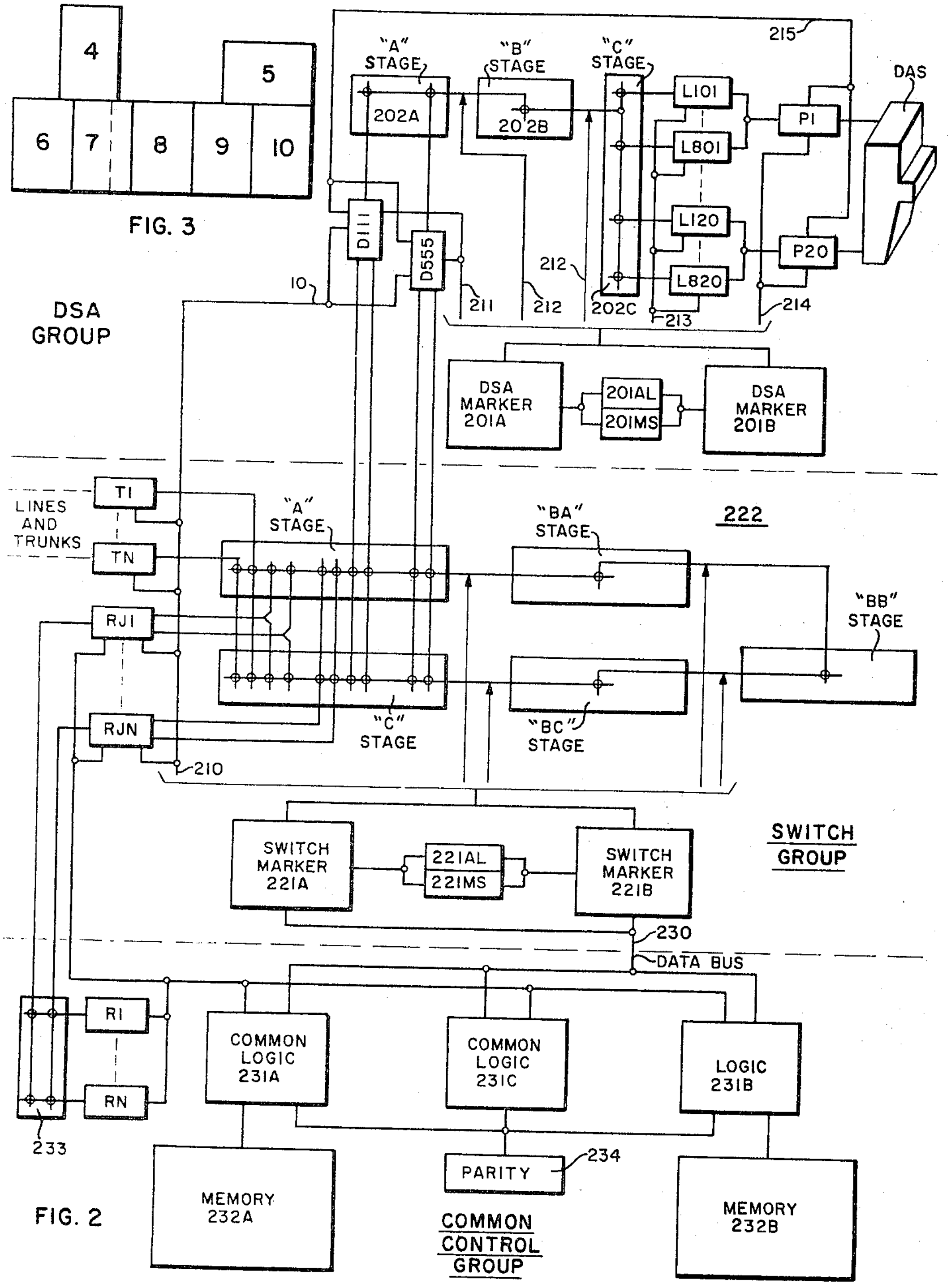
FIG. 2 is a block diagram of a communication switching system.
FIG. 3 shows how

FIGS. 4–10 comprise a block and schematic diagram of the dial service assistance group of FIG. 2.

The dial service assistance group, including its marker, is disclosed in U.S. patent application Ser. No. 517,226 filed Dec. 29, 1965, by J. R. Vande Wege for a Communication Switching Marker and Parity Check Arrangement Therefor.

Figure 1:
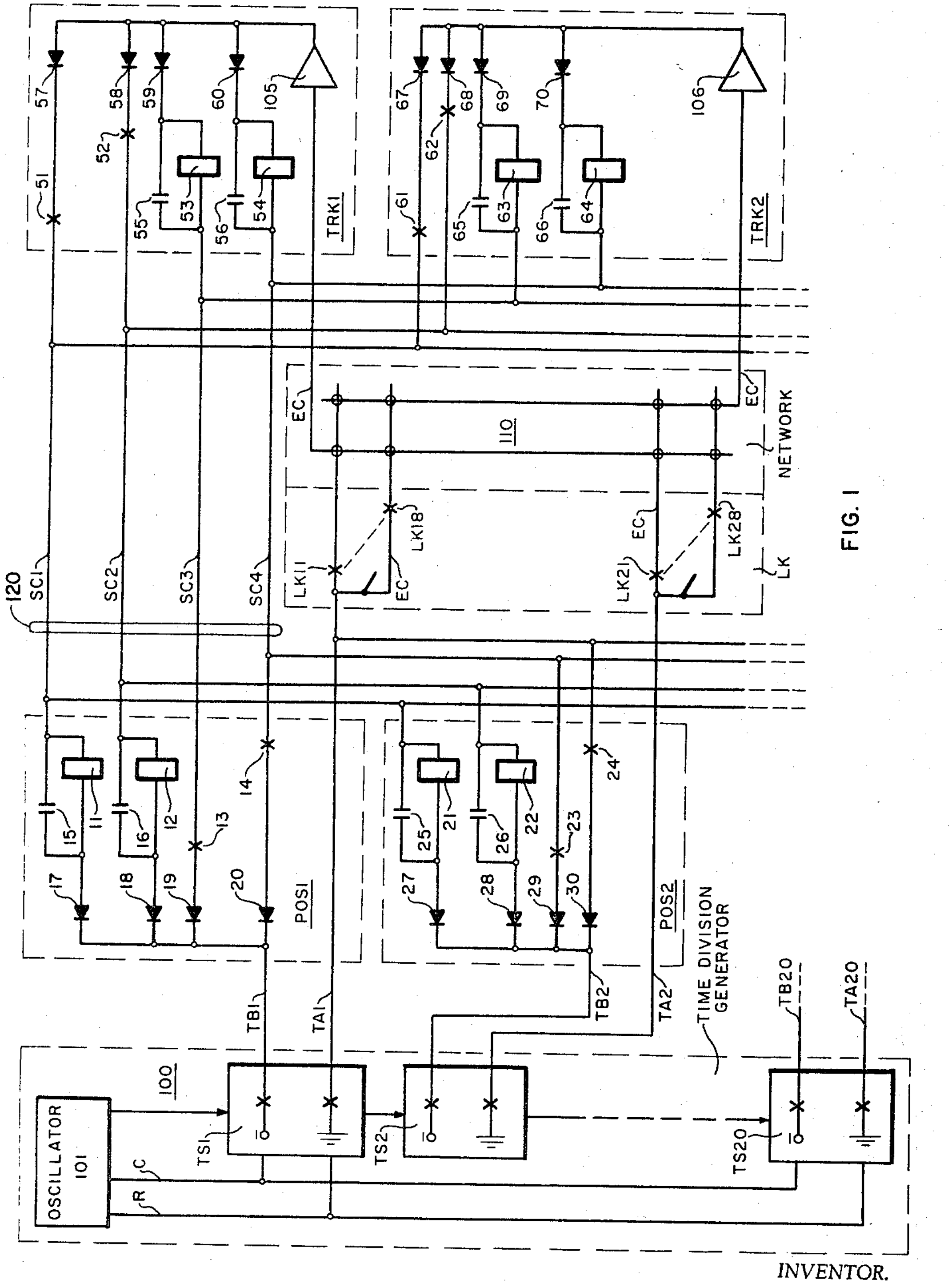
FIG. 1 is a symbolic diagram of a signaling arrangement according to the invention.

An embodiment of the time division signaling arrangement is shown symbolically in FIG. 1. A space division switching arrangement comprising a network 110 and link switch-through circuits LK interconnect two sets of terminating circuits. The first set of terminating circuits may for example be operator position circuits, of which the first two circuits, POS1 and POS2, are shown; and the other set of terminating circuits may be trunk circuits, of which the first two circuits, TRK1 and TRK2, are shown. A common time division highway 120 shown as comprising four signaling conductors SC1–SC4 also interconnects the position circuits and the trunk circuits. While only the extra control conductor EC is shown extending through the space division switching arrangement, other conductors would normally be provided for communication purposes.

The time division generator 100 comprises time division stages TS1–TS20 and a common oscillator and control unit 101. Each of the stages TS1–TS20 comprises a bistable transistor circuit driving high power transistor amplifiers acting as electronic switches. Only these output switches are shown, symbolically by X's in squares, one of which connects ground potential to an operate conductor TA and the other of which connects a negative supply voltage source (for example −47 volts) to an operate conductor TB. Thus stage TS1 has output conductors TA1 and TB1 and the other stages have corresponding outputs. The stages when connected in series form a high speed electronic counter which determines the various time division slots. The number of stages is variable, they are provided as required. Therefore with a fixed time slot width, the total cycle time depends on the number of stages equipped.

The common unit 101 includes a transistor trigger blocking oscillator (not shown) which establishes a fundamental frequency of 1900 cycles per second, which means that each time slot has a width of 527 microseconds. Lead C turns the stages "on" and "off." The "off" time is resistance-capacitance time delay controlled to prevent cross firing and is set for approximately 27 microseconds. The common unit 101 also monitors all of the stages via lead R, and when all have turned "off," resets the first stage of the chain. This special reset function prevents more than one time slot from being "on" at any one time.

Each of the common highway signaling conductors provides for the transmission of one item, or binary digit, of information; and together provide a parallel coded signaling arrangement for various types of information. Each signaling conductor has a sending device in each of the terminating circuits of one set, and a receiving device in each of the terminating circuits of the other set. The receiving devices are preferably a parallel combination of a relay and a capacitor, with the capacitor integrating the current transmitted during a particular time slot to provide a continuous operating current for the relay. Diodes connected in series with these devices isolate them so that the only discharge path for the capacitor is locally through its associated relay. The sending devices may be contacts of other relays encoding the information to be transmitted.

Each of the trunk circuits includes an amplifier for the time division signal on the extra control conductor. For example trunks TRK1 and TRK2 include amplifiers 105 and 106 respectively. With this arrangement only a low level time slot synchronizing signal is sent over the extra control conductor through the space division switching network, and the actual information is transmitted via the conductors of the common highway 120.

Note that some of the common signal conductors have the sending contacts in the trunk circuits and the receiving relay-capacitance combinations in the position circuits, while other of the signal conductors have the sending contacts in the position circuits and the receiving relays in the trunk circuit. Thus there is provision for two-way signaling.

By way of example assume that a communication path has been completed between trunk circuit TRK1 and position circuit POS2 via the first link for that position. Then when the operator answers the call and operates a link key which closes contacts LK21 a path is completed from the ground output terminal of the stage TS2 via conductor TA2 through the position circuit thence via contacts LK21 and the EC conductor through the switching network 110 to amplifier 105. The amplified ground signal is then extended through the diodes 57–60. Next assume that information stored in the trunk circuits TRK1 has closed contacts 51 while contacts 52 remain open. A path extends over the common conductor SC1 to the combination of relay 21 and capacitor 25, through diode 27 and conductor TB2 to the negative supply side of time division state TS2. Then each time time division generator 100 is in its second time slot, current from stage TS2 will cause capacitor 25 to charge, and during the remainder of the time division cycle this capacitor discharges through relay 21. The integrating effect causes the relay 21 to operate, and the information is now registered at position POS2. Similarly the operator may take action to selectively close the contacts 23 and 24 to transmit signals to be received at relays 53 and 54 respectively.

FIG. 3 is a block diagram of the principal portions of a complete exchange. The DSA (dial service assistance) group at the top of the figure corresponds to the arrangement shown in FIGS. 4–10. The exchange also includes a switch group shown in the center of the figure, and a common control group shown at the bottom of the figure. The switch group comprises a five stage network 222 for connecting together any two of a plurality of terminals. These terminals include a plurality of line and trunk circuits T1–TN of various types, a plurality of register junctor circuits RJ1–RJN, and the dial service assistance trunks D111–D555. Each of the terminal circuits T1–TN has one network terminal connection having two appearances, one at the A stage and one at the C stage. Each of the register junctor circuits has two network terminals one for receiving and one for sending, each likewise having both an A appearance and a C appearance. Each of the DSA trunks D111–D555 has two switch group network terminals, one for front connections and one for rear connections, each of these terminals having likewise both an A appearance and a C appearance at the network 222. Each of the DSA trunks D111–D555 also has one terminal appearance at the A stage 202A of the DSA group switching network 202. In addition to the A and C stages, the network 222 includes a BA stage, a BB stage and a BC stage, the entire network being a non-blocking configuration. Connections through network 222 are controlled by one of the two markers 221A and 221B, these markers being alternately on-line. An allotter 221AL and a maintenance section 221MS is common to the two switch markers 221A and 221B.

The common control group includes three common logic units 231A, 231B, and 231C, each of which receives and processes all call informaton simultaneously. A parity circuit 234 includes comparison apparatus for determining whether all three of the common logic units are in agreement, and for causing appropriate operating and maintenance action to be taken if they are not in agreement. Memories 232A and 232B are associated respectively with the common logic units 231A and 231B. Output information is taken only from one of the common logic units 231A or 231B at any one time. The common control group also includes a coordinate switching matrix 233 for connecting any one of the register junctors to any one of a plurality of receivers or transceivers R1–RN. These units individually are arranged for interexchange multifrequency receiving and sending or for subscriber touch calling multifrequency signaling. Dial pulse signaling is detected in the register junctor in which case no connection via matrix 233 is required. Each of the switch terminations also has a connection, not shown, to the common control for busy indication.

In the DSA group the dial assistance switchboard DAS has twenty positions P1–P20, and each position has eight links, those associated with position P1 being designated L101–L801 and those associated with position P20 being designated L120–L820. Each link may be connected via the network 202 having the three stages 202A, 202B and 202C to any one of the DSA trunks D111–D555. The connections through the network 202 are controlled via the DSA markers 201A and 201B which are alternately on line. Common to the two markers there is an allotter 201AL and a maintenance section 201MS. Only one of the two markers is on line at any one time.

Assume now that a call is received at terminal circuit T1 from a subscriber line to be completed to an operator. All of the terminal circuits of the switch group are connected in multiple via a multiconductor group 210 to the two switch markers 221A and 221B, and P and C conductors of the interstage links are also connected to the marker in a manner similar to those in the DSA marker 201A. Assuming that marker 221A is on line, the call is detected and identified via conductors in group 210. The information is forwarded from the marker via a multiconductor data bus 230 to the common logic units of the common control group. The common control then selects an idle register junctor such as RJ1 and via the data bus conductors 230 supply the terminal information for terminals T1 and the receiving terminal of RJ1 to the marker 221A. The marker then selects and establishes an idle path between these two terminals through the five stages of network 222 and releases. The common control group connects the junctor RJ1 via matrix 233 to a local subscriber touch calling receiver such as R1. The subscriber then transmits signals which are transmitted from the terminal T1 through the network 222 and the junctor RJ1 to the receiver R1. These signals include a designation of the priority and an operator class of call. The common logic then selects a DSA trunk such as D111, obtains the service of a marker 221A and via conductors of the data bus 230 supplies the designations of the terminals T1 and one of the terminals of trunk D111 along with the priority and class information for the call which is stored in the marker 221A. The marker then selects and establishes a connection through the network 222 from terminal T1 to the terminal of trunk D111, and also via conductors of the group 210 supplies the priority and class information to operate relays in the trunk D111.

The trunk D111 now calls for the service of a DSA marker. This marker selects an idle position and link and causes a connection to be completed through the network 202.

*DSA trunk (FIGS. 4, 6 and 7)*

Figure 4:
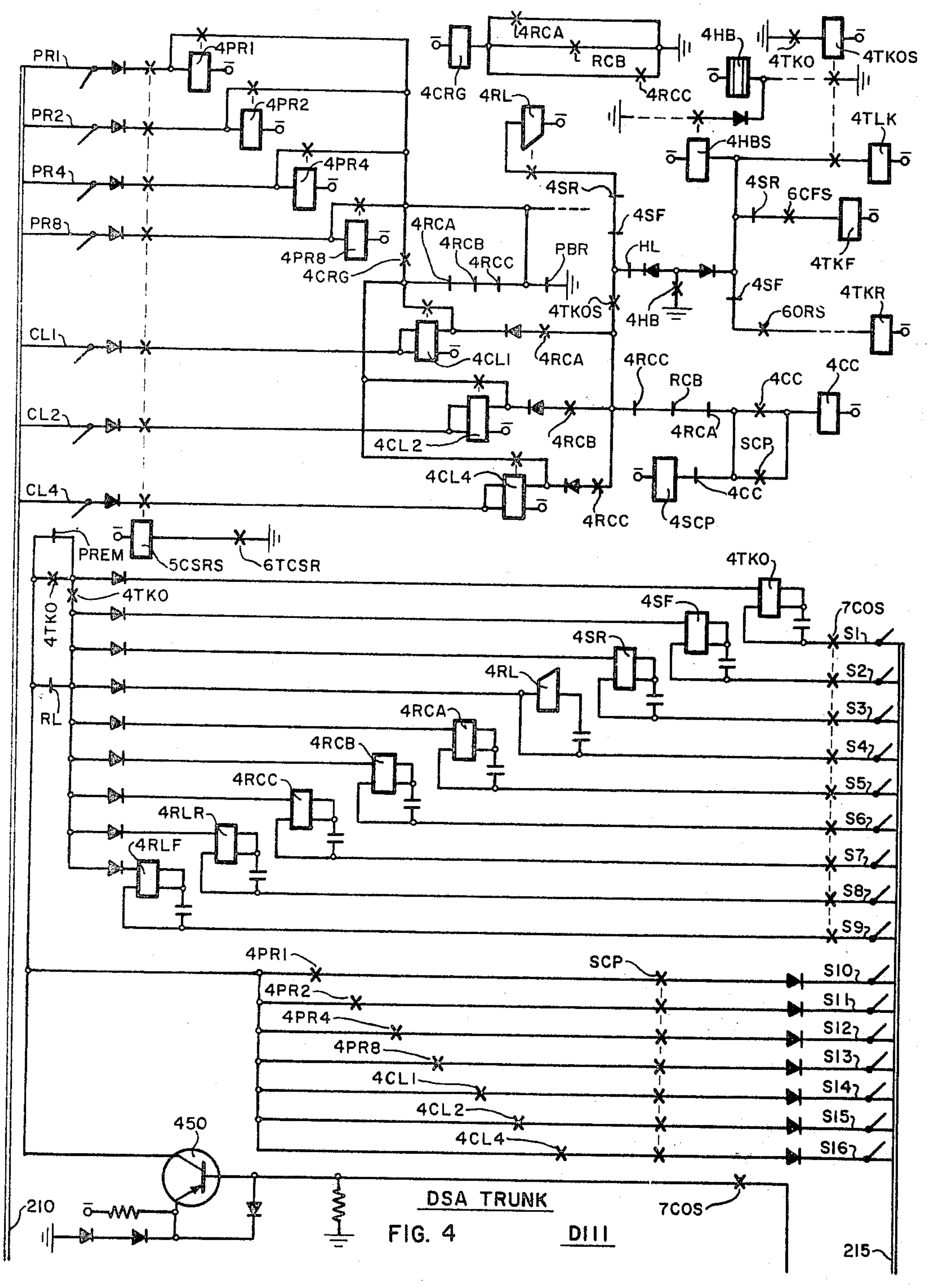
FIGS. 4–10 are to be arranged.
Figure 6:
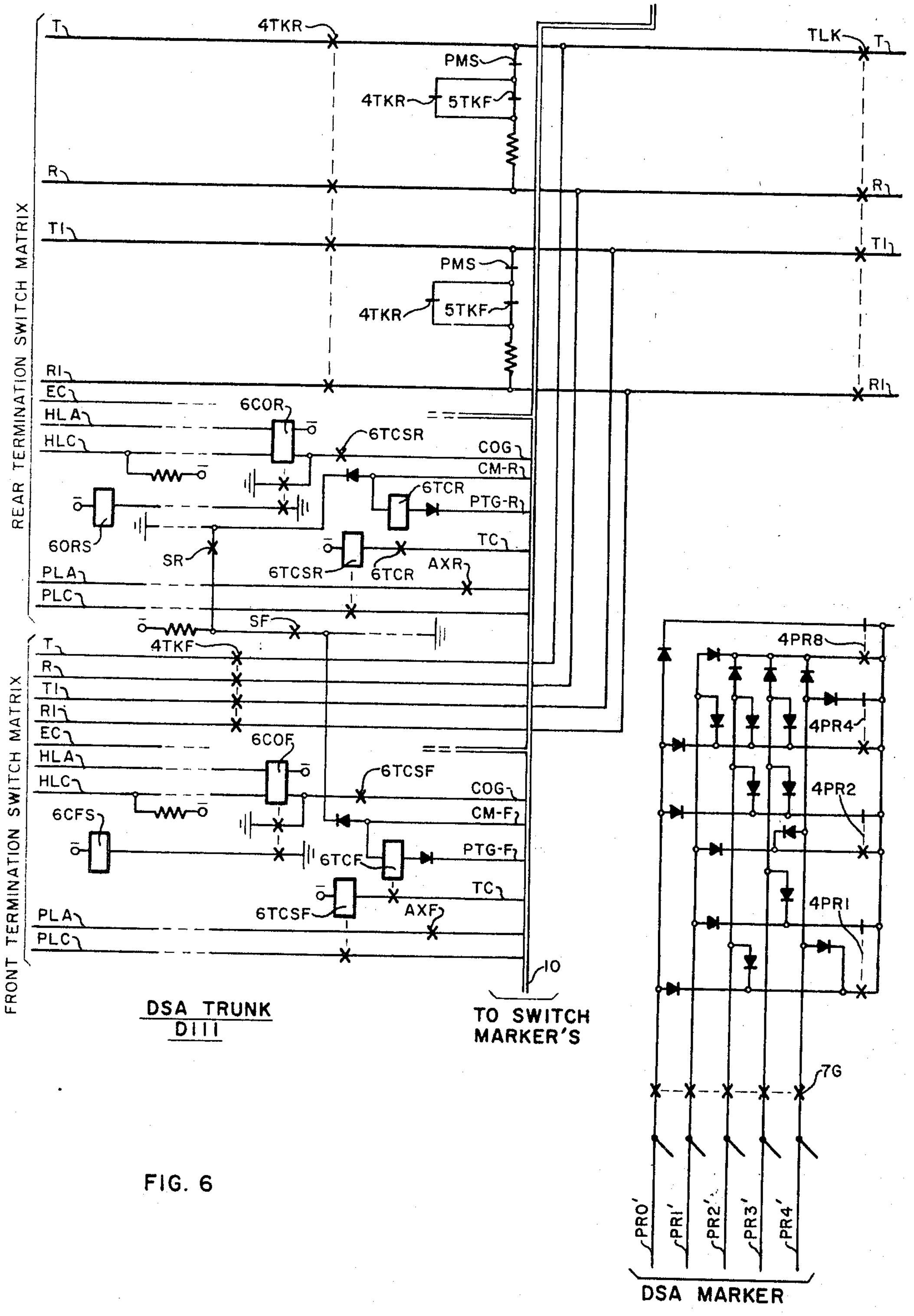
Figure 7:
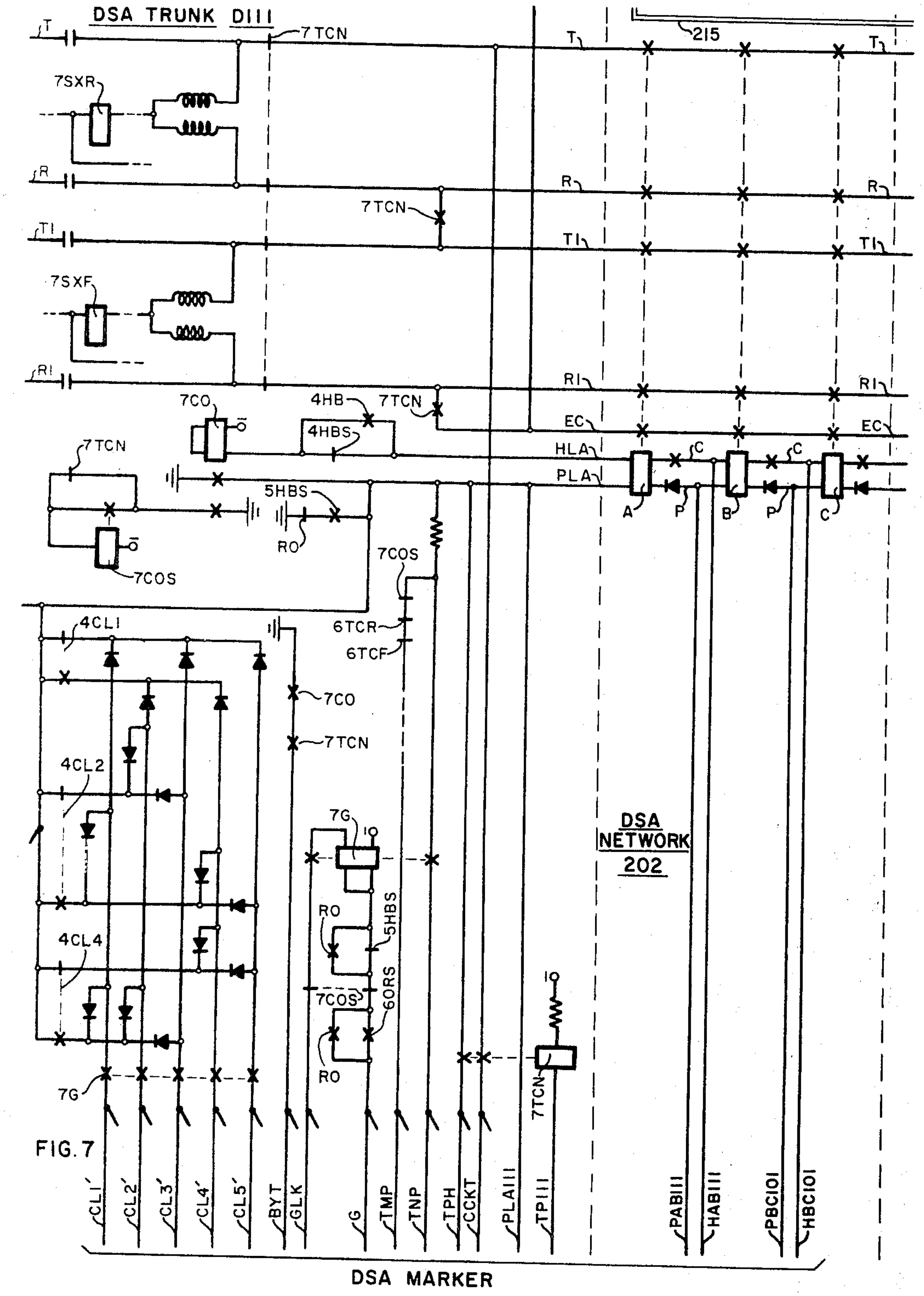

The DSA trunk D111 is shown in FIGS. 4, 6 and the left portion of FIG. 7. Only a portion of the apparatus of the trunk is shown sufficient to explain the general operation. Some of the relays have only contact sets shown, in which case the reference character does not have a figure number prefix.

Figure 5:
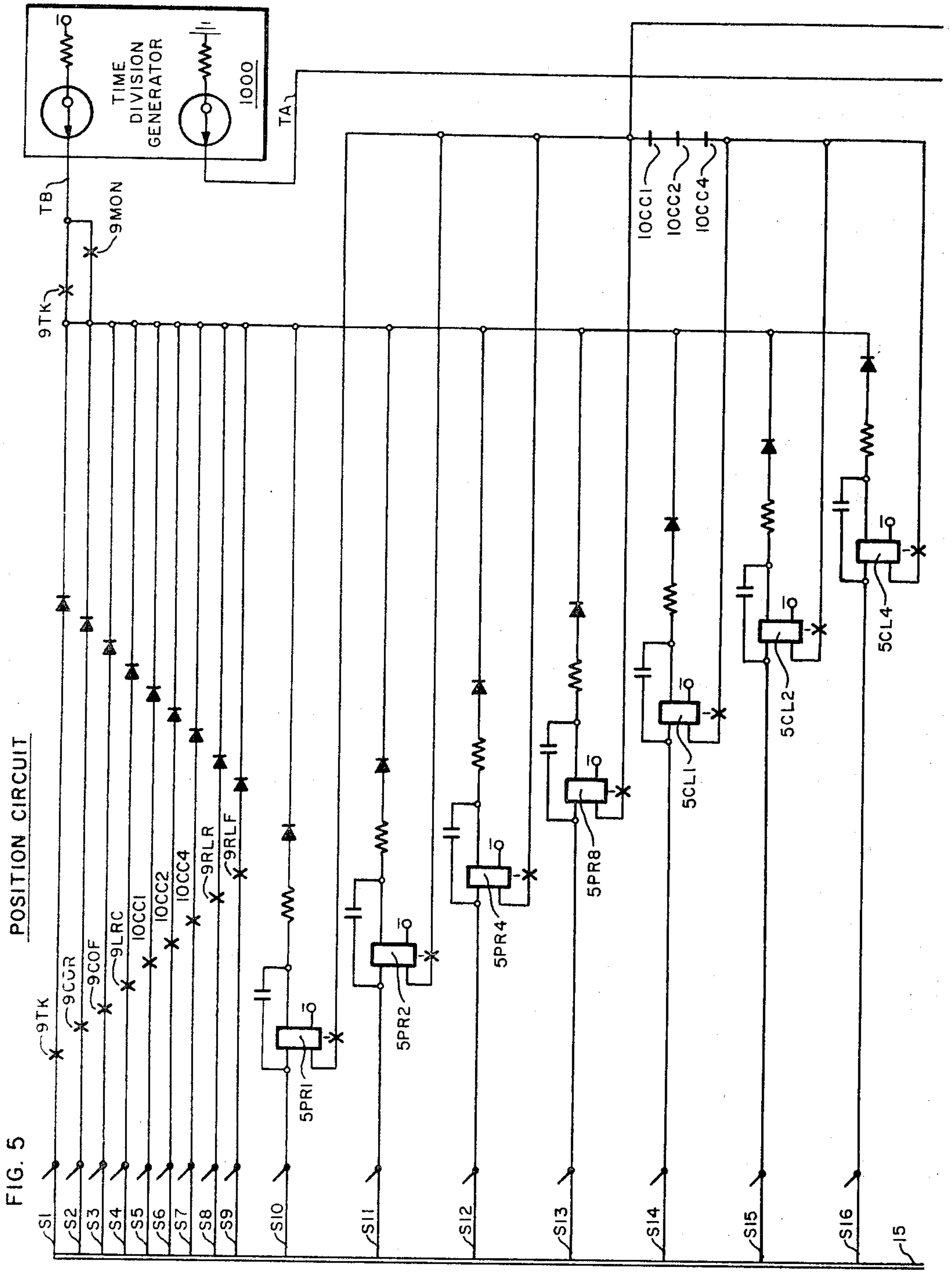

The trunk has three network terminations, two of these shown at the left side of FIG. 6 being the front and rear terminations of the switch network 222, and one shown at the top of FIG. 7 to the DSA network 202. There is also provision for time division signaling via the conductors S1–S16 of conductor group 215 connected in multiple between all of the DSA trunk circuits as shown in FIG. 4 and all of the position circuits as shown in FIG. 5.

An incoming call is received via the rear termination. The switch marker grounds the lead CM–R and places resistance battery on the lead PTG–R to operate relay 6TCR. The operation of relay 6TCR connects several conductors only part of which are shown in FIG. 6 via conductor group 210 to the switch marker. The marker places ground on lead TC to operate relay 6TCSR. The operation of relay 6TCSR connects additional ones of the conductors via conductor group 210 to the switch marker and operates relay 4CSRS to connect the leads PR1, PR2, PR4, PR8, CL1, CL2 and CL4. The switch marker forwards priority and class information via these conductors as ground signals which operate the corresponding ones of the relays 4PR1–4PR8 and 4CL1–4CL4. These relays then lock to store the information in the trunk circuit. The switch marker causes the connection through the switch network to the rear termination to be completed and it is then released. The cutoff relay 6COR is now operated in the holding path of the connection, and operates relay 6ORS. Contacts of relay 6ORS complete a connection from lead G from the DSA markers to the winding of relay 7G.

When the DSA marker is ready to accept calls it grounds lead G thereby operating relay 7G. Relay 7G locks to lead GLK, connects lead TNP via a resistor to lead PLA, and connects the priority and class diode tree to the five priority leads PR0′–PR4′ and five class leads CL1′–CL5′ to the DSA marker. The priority relays disconnect one of the priority conductors, and the class relays disconnect one of the class conductors from the lead PLA in accordance with the code combination of the relays, namely for no priority relays 4PR2 and 4PR8 operate to disconnect lead PR0′, for priorities 1, 2 or 4 the corresponding one of the relays 4PR1, 4PR2 or 4PR4 operates to disconnect the corresponding one of the leads PR1′, PR2′ or PR4′. For priority 3 relays 4PR1 and 4PR2 operate to disconnect lead PR3′. For class of call information, operation of one of the relays 4CL1, 4CL2 or 4CL4 opens the connection to the corresponding one of the leads CL1′, CL2′ or CL4′; operation of relays 4CL1 and 4CL2 opens the connection to lead CL3′, and operation of relays 4CL1 and 4CL4 opens the connection to lead CL5′. The marker grounds one of the five leads PR0′–PR4′ and one of the class leads CL1′–CL5′ to thereby place ground on lead PLA for all calling DSA trunk circuits except those having their priority and class relays operated to indicate the priority and class then being serviced by the marker.

A negative potential on lead TNP via the contacts of relay 7G on lead PLA causes a call for service signal to be extended through the DSA network 202 to lead PBC101 to inform the DSA marker of the call for service. The DSA marker then identifies the calling trunk via the negative potential on leads PBC101, PAB111 and PLA 111. To complete the connection through the DSA network 202 the marker grounds lead TP111 to operate the connect relay 7TCN. The marker subsequently places —50 volt potential on lead TPH which extends through the contacts of relay 7TCN to lead PLA to operate the selected path through the DSA network 202. A continuity check is made from lead CCKT through contacts of relay 7TCN to conductor T and also shorting together leads R and T1, and R1 and EC to make the continuity check through the network. Relay 7CO operates in the hold path of the network. The DSA marker releases, and relay 7COS operates connecting the leads S1–S9 of the time division signaling group 215. The DSA operator is summoned by a flashing lamp in the associated link. The operator answers by operating the appropriate talk key. Time division signals via the lead EC through the network and transistor 450 operate relay 4TKO via conductor S1. The operation of 4TKO operates relays 4TKOS. Relay 4TKOS operates relay HB and also relay 7SXF via path not shown. The operation of relay 4HB operates relays 4TLK, 4TKR, 4HBS, and 4SCP. The operation of relays 4TLK and 4TKR extend the transmission path to the operator. The operation of relay 4SCP extends the leads S10–S16 and closes relay 4CC. The time division class and priority signals are forwarded to the DSA position through the contacts of the operated class and priority relays and conductors S10–S16. After its slow-to-operate interval, relay 4CC operates, locks, and releases relay 4SCP.

To extend the call the operator operates the key in the position circuit which operates the relay 4SF via time division signals. The operation of relay 4SF releases relay 4TKR to cut off the calling party, and connects negative battery potential to lead CM–F to provide a call for service signal to the switch marker via conductor group 210. The switch marker then provides a connection from the front termination through the switch network 222 to a register junctor, in the same manner as described for the connection to the rear termination. When the register is ready to accept information, relay 7SXF is used to extend a simplex signal vit the network 202 to light a send pilot lamp. The operator keys in the called number with the first digit being the priority and restores the send front cutoff rear key, but does not restore the talk key. When the send front cutoff rear key is restored the time division signal is removed from lead S2 restoring relay 4SF, which operates relay 4TKR. The register processes the call and then drops the register-DSA trunk connection and establishes a second and final path from the front termination to a switch network terminal.

The operator can change the calling (rear) party's class by keying in a new class to operate various combination of relays 4RCA, 4RCB and 4RCC by time division signals over leads S4, S5 and S6. The operation of one or more of these relays releases the holding ground of the previously operated class relays, releases relay 4CC, and operates relay 4CRG. After its slow-to-operate interval, relay 4CRG operates and connects a holding ground to the class correeds. When the class keys are restored at the position, the relays 4RCA, 4RCB, and/or 4RCC restore, release relay 4CRG, and operate relay 4SCP. Relay 4SCP extends leads S10 to S16 to provide a display of the new class, and operates relay 4CC. After its slow-to-operate interval, relay 4CC operates and releases relay 4SCP.

After receiving the off hook signal, the operator may disconnect without releasing the link by restoring the associated talk key. This removes the time division signal from lead EC to cut off transistor 450. This releases relay 4TKO, which in turn releases relay 4TKOS. Relay 4TKOS restores and releases relays 4CC and 4TLK. Since the link has not been released, the operator retains complete front and rear supervision. The operator may also reenter the transmission facility by operating the associated talk or monitor key to operate relays 4TKO, 5TKOS, and 4TLK. Relays 4SCP and 4PC repeat the class and priority cycle.

If the operator desires to release the link upon retiring from the call, the link release key is operated at the associated position. A time division signal via lead S4 operates relay 4RL which locks at its second winding. The operator then restores the associated talk key cutting off transistor 450 and releasing relays 4TKO and 4TKOS, and also releasing the matrix connection. The release of relays 4TKOS releases relays 4TLK and 4CC. The release of the matrix connection releases relays 7CO and 7COS. Relays 7SXR and 7SXF are operated, thus maintaining the off hook supervision to the calling and the called party. When the operator disconnects in this manner, the circuit cannot be reaccessed by operating the associated talk or monitor key. The associated link has been released and is free to handle subsequent calls. The operator can cancel the link release operation by momentarily operating the send front or send rear key. Relays 4SF or 4SR momentarily operate opening the locking winding of relay 4RL.

Figure 8:
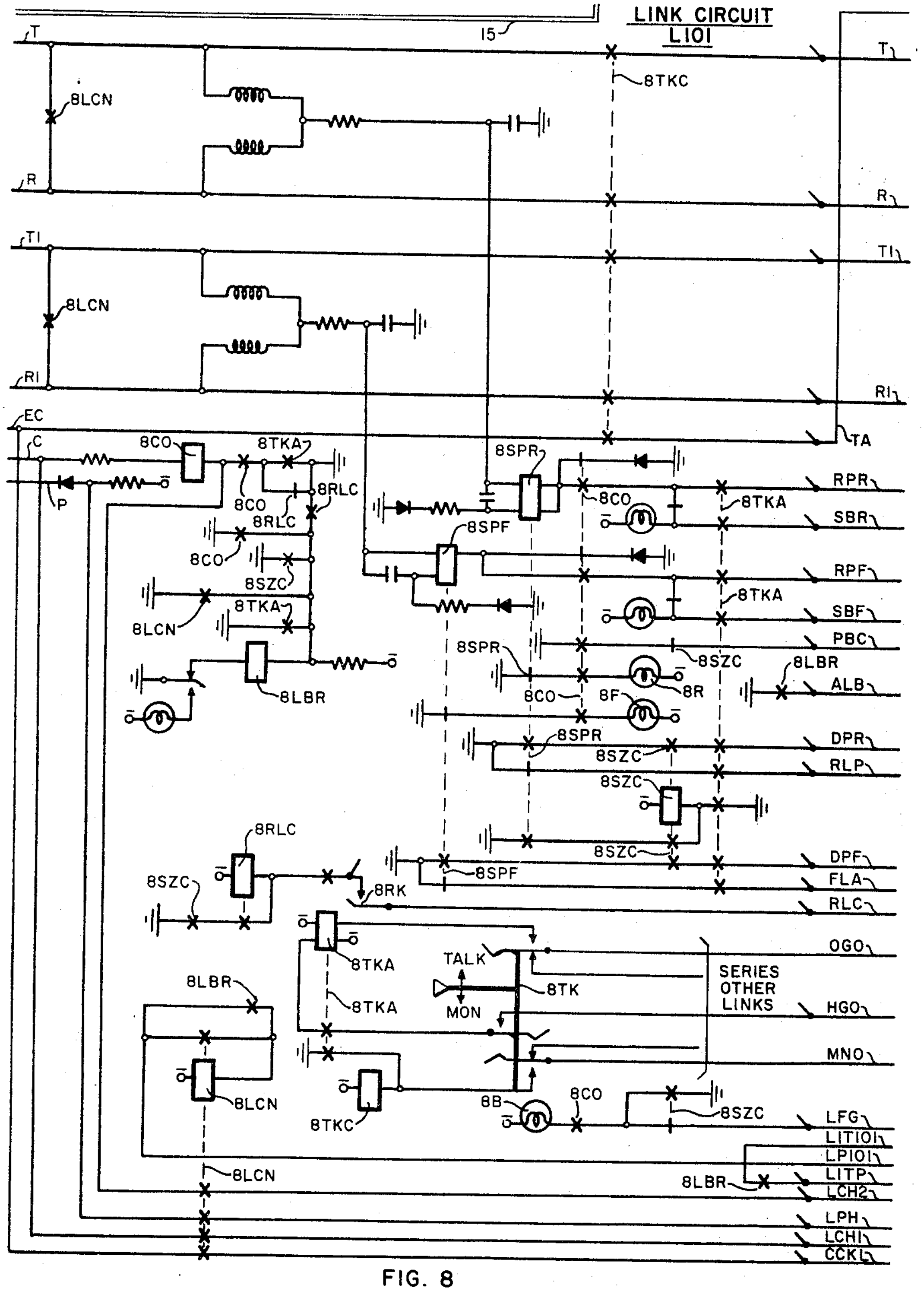

*Link circuit* (*FIG. 8*)

One of the eight links associated with position P1 is shown in FIG. 8. Each link has the following controls and supervisory lamps at the operator position: link busy lamp 8B, rear supervisory lamp 8R, front supervisory lamp 8F, trunk and monitor key 8TK, and link release key 8RK. Since all eight link talk keys are connected in series, only one link can be accessed at a time.

Each link can be associated with the common position equipment for re-ring, sending, etc. Once a link is associated with a DSA trunk and the call extended, the operator can hold or release the link. The operator can monitor the call any time if the link is held, but if the link is released, the call cannot be monitored.

Signaling between the DSA link and the DSA trunk is accomplished via simplex derived circuit paths with differential relay circuits 8SPR and 8SPF in the link and relays 7SXR and 7SXF in the trunk to provide two way, on-off hook supervision front and rear.

The marker in the operation of setting up a call scans conductor LIT101 and finds the link idle, as indicated by the continuity of the connection between leads LITP and LIT101. The link busy relay 8LBR is normally operated when the link is idle. When the DSA marker selects the idle link, ground is forwarded via lead LP101 to operate the connect relay 8LCN. A continuity check is made through contacts of relay 8LCN connecting lead CCK1 to the EC conductor of the network connection and connecting together leads T and R and also leads T1 and R1 which in conjunction with a connection through contacts of relay 7TCN in the trunk completes a path to lead CCKT connecting the five network conductors in series. After the continuity has been verified, the ground shunt provided on conductor LCH1 by the DSA marker is removed and the link cutoff relay 8CO operates. Ground is then removed from lead LCH2. Operation of the cutoff relay 8CO causes the busy relay 8LBR to release, marking the link busy to the marker.

The operation of relay 8CO causes the link busy lamp 8B to flash at 60 IPM and the link front and rear supervisory lamps 8F and 8R to light. Upon release of relay 8LCN, the off-hook signal forwarded by the DSA trunk causes the differential relay 8SPR to operate. The link rear supervisory lamp 8R is extinguished. The operator now has 60 IPM flash of link busy lamp 8B, and off-hook indication and on-hook of the rear and front supervisory lamps 8R and 8F respectively.

The operator answers by operating the proper link talk key 8TK. Relay 8TKA operates and locks via resistance ground on lead HGO. Relay 8TKC also operates. The four transmission conductors and lead EC are connected through to the position. The operator then performs the functions necessary to complete the call at the position. When the called party answers, the DSA trunk forwards the off-hook signal operating relay 8SPF to extinguish the front supervisory lamp 8F.

If the operator wishes to disconnect, but still hold the link to maintain complete front and rear supervision, the link talk key 8TK is restored opening relays 8TKA and 8TKC. This disconnects the front and rear supervisory leads, and also the transmission conductors from the position. If the operator wishes to reaccess the transmission facilities, the appropriate talk key 8TK is operated. If the operator wishes to monitor the conversation, the key 8TK is operated to the monitor position, operating relay 8TKC to connect the transmission conductors to the operator position.

The operator may retire from a DSA trunk and release the associated link, by first operating the link release key 8RK, and then restoring the talk key 8TK. The operator cannot access the DSA trunk once the link has been released. The front and rear transmission conductors are connected together in the DSA trunk. When the link release key 8RK is operated relay 8RLC operates and locks. Restoring the talk key 8TK causes relays 8TKA, 8TKC, 8CO, 8SPR, 8SPF, 8SCZ, and 8RLC to release and 8LBR to operate. The operator can cancel the link release operation by momentarily operating the send front or send rear key before restoring the talk key. Once the link is released, it is idle and ready for another call.

Figure 9:
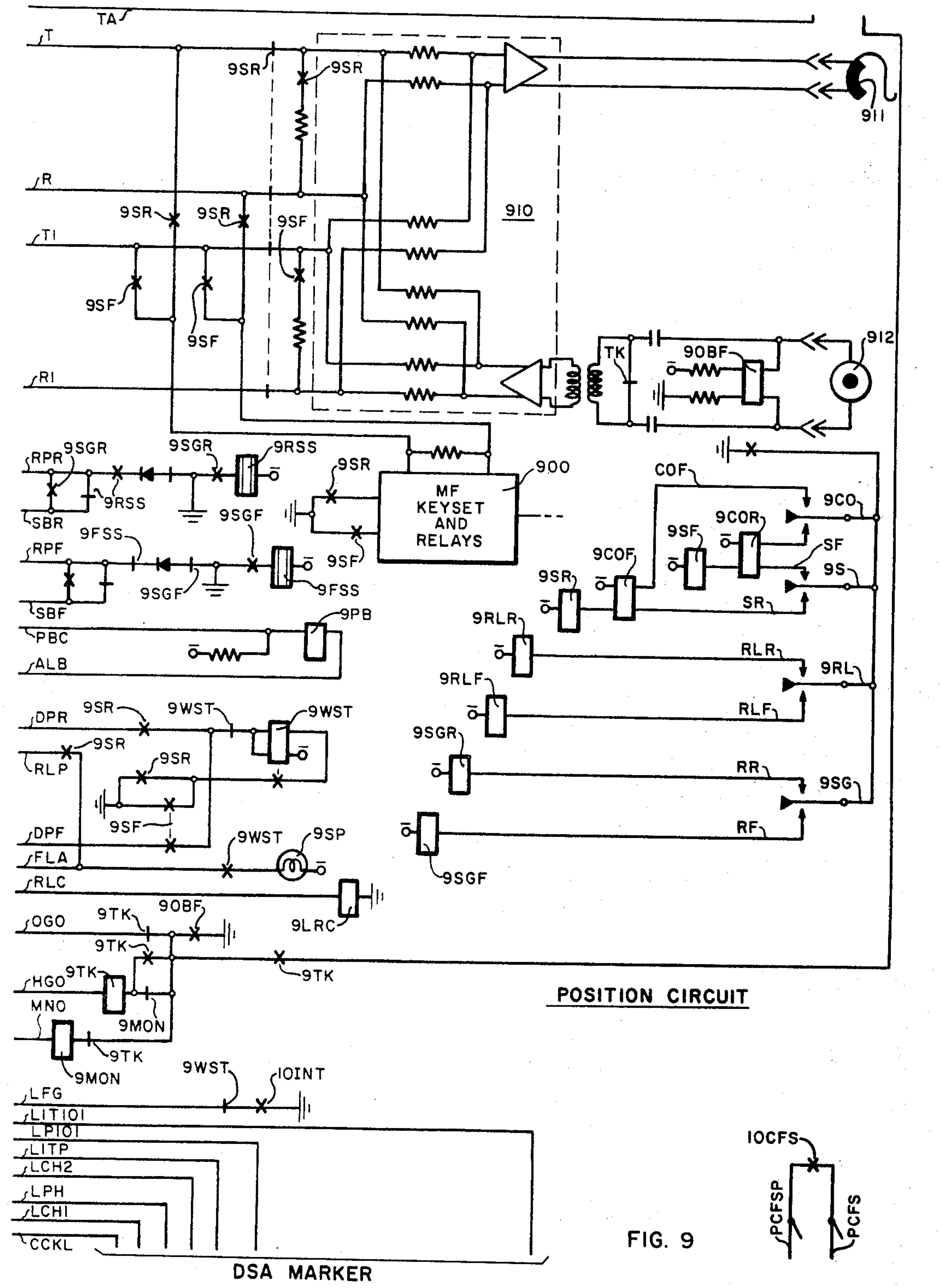
Figure 10:
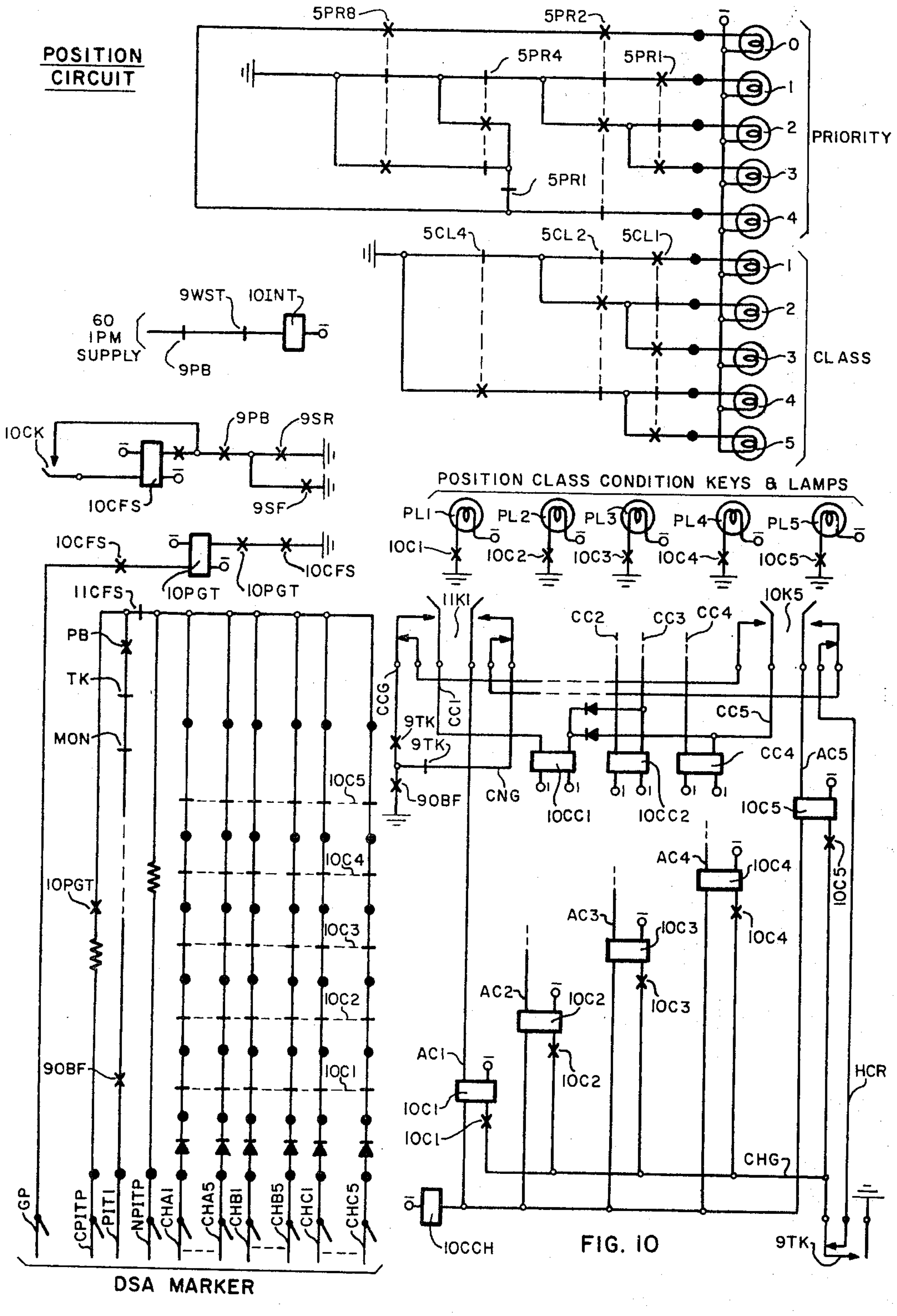

*Operator's position circuit* (*FIGS. 5, 9 and 10*)

The DSA position circuit is used to perform certain functions in a DSA trunk via one of the eight DSA link circuits associated with the position control. The DSA position has the following control equipment: position class conditioning keys 10K1–10K5, key set circuits 900, position call for service key 10CK, ring front and ring rear key 9SG, cutoff front and rear key 9CO, send front and rear key 9S, and release front and rear key 9RL. The DSA position circuit provides an operator's coupling circuit 910 which includes amplifiers and resistors to couple the operator's telephone to a four wire circuit between two parties. Time division signaling is used to signal between the position and the DSA trunk.

The operator must have the operator's telephone set comprising receiver 911 and transmitter 912 connected to the position circuit to accept or initiate calls. Relay 90BF operates when the position is staffed.

The operator must operate one of the position class conditioning keys 10K1–10K5 to accept calls. The DSA marker assigns calls to a position on a choice-class basis. Each position will accept certain classes of calls for first, second and third choice. There are five different class accepting conditions for each position. Each of the class accepting conditions is determined by a strapping option via strapping terminals and break contacts of the relays 10C1–10C5 in conductors connected through respective diodes to the fifteen conductors CHA1–CHC5. Relays 10C1–10C5 are class conditioning relays, one associated with each condition. The operator can select the desired condition by operating the respective class conditioning key. The operator lamps PL1–PL5 indicate the class acceptance condition of the position. The class condition can be changed by the operator, when the link talk keys are not operated, by momentarily operating another class conditioning key.

By way of example, the class assignment may be:

| | |
|---|---|
| Class 1 | Assistance. |
| Class 2 | Inward. |
| Class 3 | Information and intercept. |
| Class 4 | Conference. |
| Class 5 | Record. |

In extending a call to a position, the DSA marker first checks lead PIT1 for idle indication. If an idle position is available, the marker grounds the appropriate choice 1 lead CHA1–CHA5 to determine if the position can accept the incoming class of call. Each position has designated, by the operation of a class conditioning relay 10C1–10C5, which class of call is to be accepted for choice 1, choice 2, and choice 3. If none of the positions can accept the call as first choice, the marker checks which position can handle the call as a second choice. If at the end of the third choice, no position can handle the call, the marker returns to choice 1 and repeats the cycle.

When a link is connected to a position, the operator receives a locally generated acceptance tone (not shown). Relay 9PB restores. Relays not shown operate to provide the tone. The operator also receives a 60 IPM flash on the respective link supervisory lamp indicating a call is waiting. This signal is extended by the link circuit. Relay 10INT operates at 60 IPM to provide the 60 IPM flashing ground.

The operator answers the call by operating the respective link talk key. Relay 9TK and relay 9PB operate. Relay 10INT and the tone relays restore. The class relays 5CL1–5CL4, and priority relays 5PR1–5PR8, which indicate the class and priority of the incoming call on associated lamps (FIG. 10), operate via time division signals from the associated trunk. Each time the operator enters a link by operating the talk key, the class and priority information is displayed.

The operator operates the send key 9S to the send forward position operating relays 9COR and 9SF in series. The time division signaling arrangement includes a time division generator 1000 represented symbolically by two scanners which operate in synchronism to connect battery to lead TB and ground to lead TA. Lead TA is extended via the EC lead of the transmission path through the link and DSA network. Lead TB is connected via contacts of relay 9TK or 9MON to the TDM signaling arrangement.

The operation of relay 9COR connects the time division negative potential to lead S2 to cause the DSA trunk to cut off transmission to the rear (calling) party.

After a register is connected to the front access of the DSA trunk, the register returns a 100-millisecond start dial signal which is repeated to the position via lead DPF from the link circuit to the position circuit. Relay 9WST operates a set of make contacts at the start of the start dial signal and short circuits its upper winding. At the end of the start dial signal ground is removed from lead DPF. Relay 9WST operates fully and lights the send pilot lamp 9SP.

The operator keys the desired number using the key set circuit 900. A priority signal is keyed in followed by the desired number. After keying has been completed, the send key 9S is restored. Relay 9COR, relay 9SF, and 9WST restore. The operator may wait to verify the called party answer, or the link talk key may be restored before answered. The link front and rear lamp supervisory is maintained in either case.

When the link talk key is restored, relays 9TK and the class and priority indicating relays 5CL1–5CL4 and 5PR1–5PR8 release. If the operator operates the link release key, relay 9LRC operates momentarily.

The operator can condition the position to accept certain class calls on a choice basis. With the link talk key not operated, the operator can change the class condition by momentarily operating the desired one of the five class conditioning keys 10C1–10C5. Each class conditioning key has an associated lamp PL1–PL5 to indicate the condition under which the position is operating. Assume the class condition is to be changed from class 2 to class 4. Key 10C4 is operated momentarily. Ground is momentarily removed from the conductor CHG releasing relay 10C2 which extinguishes lamp PL2, and closing relay 10C4 in series with relay 10CCH. The operation of relay 10CCH grounds lead LCS. When key 10K4 is restored, relay 10CCH restores and relay 10C4 locks to ground on lead CHG.

The operator can change the class of a call by changing the storage in the DSA trunk. To change the storage in the trunk the link talk key must be operated, which causes relay 9TK to operate. The position class conditioning keys 10K1–10K5 are used. If the operator wishes to change the class of a call from class 3 to class 5 key 10K5 is operated momentarily, operating relays 10CC1 and 10CC4, and time division negative potential from lead TB is connected to leads S5 and S7 to store the new class in the DSA trunk. When key 10K5 is restored, relays 10CC1 and 10CC4 restore. The DSA trunk returns the new stored information operating the class lamps (FIG. 10) to provide a display of the new class information.

The operator may also initiate a call by operating the send key 9S to the send front position operating relays 9SF and 9COR. The call for service key 10CK is momentarily operated closing relay 10CFS, which operates, locks, and initiates a call for service by connecting leads PCFSP and PCFS (FIG. 9). When the marker opens the gate to accept calls, ground via lead GP operates relay 10PGT. The relay locks and connects leads PIT1 and CPITP via a resistor to provide an indication to the marker that this position is requesting service. After identifying the position requesting service, the marker selects an idle link associated with this position and connects the link to a DSA trunk. When checks and verifications are completed, the DSA marker releases.

The operator operates the link talk key. Relay 9TK and 9PB operate. The operation of relay 9PB releases relay 10INT. The operator then extends the call.

While we have described above the principles of our invention in connection with specific apparatus, it is to be clearly understood that this description is made only by way of example and not as a limitation to the scope of our invention.

What we claim is:

1. A signaling arrangement for use in a communication switching system having a first set of terminating circuits, a second set of terminating circuits, and a switching arrangement for selectively connecting any terminating circuit of the first set to any terminating circuit of the second set;

said signaling arrangement comprising a plurality of signaling conductors connected in common to all of the terminating circuits of each set, each signaling conductor being coupled to a sending device in each of the terminating circuits of one set and a receiving device in each of the terminating circuits of the other set, a time division power supply including a plurality of output terminal pairs and operating to provide switched signal potentials to each said pair in a cyclic manner during discrete recurring time slots, each terminating circuit of the first set being connected to separate ones of said time division terminal pairs, with one terminal connected to a given conductor of the switching arrangement and the other terminal of the pair coupled in common to said devices thereof, means coupling said given switching arrangement conductor at each terminating circuit of the second set in common to said devices thereof, so that a connection via said switching arrangement between any terminating circuit of the first set and any terminating circuit of the second set completes a signaling loop from one time division terminal associated with the terminating circuit of the first set via said given conductor of the switching arrangement to the terminating circuit of the second set, said devices of the terminating circuit of the second set, said signaling conductors, said devices of the terminating circuit of the first set and the other terminal of the time division pair, and means to selectively operate certain ones of the sending devices to thereby cause operation of the corresponding receiving devices in the terminating circuits associated with said switching arrangement connection.

2. A signaling arrangement as claimed in claim 1, wherein said terminating circuits of the first set are operator position circuits, said switching arrangement comprises a switching network and a plurality of operator link circuits, there being a group of said link circuits connected to each position circuit, simultaneous connections from the link circuits via the switching network to separate terminating circuits of said second set being possible, and switch-through means in each link circuit to complete the connection including said given conductor from a position circuit to the switching network.

3. A signaling arrangement as claimed in claim 2, wherein said receiving devices each comprise a relay-capacitance combination in which each capacitance charges in response to its corresponding time-slot signal potential and discharges through its corresponding relay during the remainder of the cycle to provide an effective voltage that is sufficient to operate the relay; and further comprising a plurality of diode means each interposed between separate ones of said relay-capacitance combinations and the corresponding time division power supply output terminal pairs for isolating said combinations one from the other and insuring a local discharge of each said capacitance.

4. A signaling arrangement as claimed in claim 3, wherein said means couping said given conductor at each terminating circuit of the second set includes amplifying means having its input connected to said given conductor and its output connected to the common connection to said devices of that terminating circuit of the second set.

5. A signaling arrangement as claimed in claim 3, wherein said sending devices are contact sets of relays providing input information.

6. A signaling arrangement as claimed in claim 3, wherein some of said signaling conductors are connected in common to sending devices in terminating circuits of the first set and receiving devices in terminating circuits of the second set, while the other of the signaling conductors are connected to sending devices in terminating circuits of the second set and receiving devices in terminating circuits of the first set, whereby two-way signaling is provided.

7. A signaling arrangement as claimed in claim 6, wherein the information sent via said signaling conductors from a terminating circuit of the second set to a position circuit includes class-of-call information which is displayed at the operator position, and wherein each position circuit further includes means to supply information to the sending devices thereat to change the class of call, this information being sent via the common signaling conductors to the corresponding terminating circuit of the second set, which includes means responsive thereto to effectively change the class of the call.

8. A signaling arrangement as claimed in claim 1, wherein some of said signaling conductors are connected in common to sending devices in terminating circuits of the first set and receiving devices in terminating circuits of the second set, while the other of the signaling conductors are connected to sending devices in terminating circuits of the second set and receiving devices in terminating circuits of the first set, whereby two-way signaling is provided.

9. A signaling arrangement as claimed in claim 1, wherein said receiving devices each comprise a relay-capacitance combination in which each capacitance charges in response to its corresponding time slot signal potential and discharges through its corresponding relay during the remainder of the cycle to provide an effective voltage that is sufficient to operate the relay; and further comprising a plurality of diode means each interposed between separate ones of said relay-capacitance combinations and the corresponding time division power supply output terminal pairs for isolating said combinations one from the other and insuring a local discharge of each said capacitance.

10. A signaling arrangement as claimed in claim 9, wherein said means coupling said given conductor at each terminating circuit of the second set includes amplifying means having its input connected to said given conductor and its output connected to the common connection to said devices of that terminating circuit of the second set.

References Cited

UNITED STATES PATENTS 3,317,677 5/1967 Chudkosky et al.

KATHLEEN H. CLAFFY, *Primary Examiner.*

W. A. HELVESTINE, *Assistant Examiner.*